US012639945B2

(12) United States Patent
Lukaszewski et al.

(10) Patent No.: US 12,639,945 B2
(45) Date of Patent: May 26, 2026

(54) AUTOMATIC DETERMINATION OF INDOOR OR OUTDOOR STATE OF A DEVICE BASED ON 3D GEOPOSITION AND VOLUMETRIC STRUCTURAL DATA

(71) Applicant: HEWLETT PACKARD ENTERPRISE DEVELOPMENT LP, Houston, TX (US)

(72) Inventors: Charles Lukaszewski, Santa Clara, CA (US); Stuart Walker Strickland, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 438 days.

(21) Appl. No.: 17/869,541

(22) Filed: Jul. 20, 2022

(65) Prior Publication Data

US 2024/0029433 A1      Jan. 25, 2024

(51) Int. Cl.
  *G06V 20/00*         (2022.01)
  *G01S 19/45*         (2010.01)
    (Continued)

(52) U.S. Cl.
  CPC .............. *G06V 20/35* (2022.01); *G01S 19/45* (2013.01); *G06T 15/08* (2013.01); *G08B 13/196* (2013.01)

(58) Field of Classification Search
  CPC ........ G06V 20/00; G06V 20/35; G01S 19/45; G01S 5/02; G01S 5/0244; G01S 5/025;
    (Continued)

(56) References Cited

U.S. PATENT DOCUMENTS

| | | | |
|---|---|---|---|
| 7,397,357 B2 * | 7/2008 | Krumm | G01W 1/17 |
| | | | 340/517 |
| 7,962,134 B2 | 6/2011 | Wahlberg et al. | |

(Continued)

FOREIGN PATENT DOCUMENTS

| | | |
|---|---|---|
| CN | 103513227 A | 1/2014 |
| CN | 104737030 A | 6/2015 |

(Continued)

OTHER PUBLICATIONS

"ONEGEO", available online at <https://web.archive.org/web/20240518214852/https://onegeo.co/>, May 19, 2024, 8 pages.

(Continued)

*Primary Examiner* — Stephen R Koziol
*Assistant Examiner* — Benedict E Lee
(74) *Attorney, Agent, or Firm* — Sheppard Mullin Richter & Hampton LLP

(57)          ABSTRACT

Systems and methods are provided for deterministically estimating whether the location of a computing device that is fixed or mobile is inside a building or not using location data. Particularly, the system may compare 3D geoposition uncertainty region of a location to a 3D volumetric structure shape of the location, and determining a confidence value based on the comparison associated with a likelihood that the location associated with the computing device is indoors or outdoors. Various states of the computing device are supported by the substance of the disclosure, including indoor and outdoor states.

20 Claims, 11 Drawing Sheets

(51) Int. Cl.
    *G06T 15/08*            (2011.01)
    *G08B 13/196*       (2006.01)
(58) Field of Classification Search
    CPC ...... G01S 5/0278; G01S 19/39; G01S 19/396;
                        G01S 19/48; G01S 5/00; G01S 5/012;
                     G01S 19/42; G01S 5/0294; G06T 15/08;
                   G08B 13/196; H04W 4/02; H04W 4/025;
                   H04W 4/33; G01C 21/20; G01C 21/005;
                   G01C 21/206; G01C 21/24; G01C 21/26;
                                            G01C 21/30
    See application file for complete search history.

(56)               References Cited

U.S. PATENT DOCUMENTS

| | | | |
|---|---|---|---|
| 8,417,534 B2 | 4/2013 | Belzer et al. | |
| 8,533,266 B2 | 9/2013 | Koulomzin et al. | |
| 8,533,853 B2 | 9/2013 | Jones et al. | |
| 8,692,715 B2 * | 4/2014 | Siomina | G01S 5/10 |
| | | | 342/387 |
| 8,713,324 B2 | 4/2014 | Wahlberg et al. | |
| 8,751,151 B2 | 6/2014 | Funk et al. | |
| 9,255,983 B2 | 2/2016 | Thaker | |
| 9,326,104 B2 | 4/2016 | Chen et al. | |
| 9,342,970 B2 | 5/2016 | Green et al. | |
| 9,706,364 B2 * | 7/2017 | Kay | G01C 21/206 |
| 9,759,561 B2 | 9/2017 | Young et al. | |
| 9,766,078 B2 * | 9/2017 | Friedler | G01C 21/206 |
| 9,903,755 B2 | 2/2018 | Albadawi et al. | |
| 9,998,874 B2 * | 6/2018 | Sendonaris | G01C 5/06 |
| 10,012,964 B2 * | 7/2018 | Deilmann | G05B 15/02 |
| 10,237,806 B2 * | 3/2019 | Cohn | H04L 12/2818 |
| 10,325,354 B2 | 6/2019 | Noyes et al. | |
| 10,506,372 B2 * | 12/2019 | Yoon | H04M 1/72451 |
| 10,602,476 B2 * | 3/2020 | Dormody | H04W 64/003 |
| 10,753,762 B2 * | 8/2020 | Shelby | G06F 16/00 |
| 10,805,784 B2 * | 10/2020 | Edge | H04W 4/12 |
| 10,948,606 B2 * | 3/2021 | Aoyama | G01S 19/42 |
| 10,979,854 B2 | 4/2021 | Kong et al. | |
| 11,049,069 B2 | 6/2021 | Huberman et al. | |
| 11,073,441 B2 * | 7/2021 | Dormody | G01L 19/00 |
| 11,134,461 B2 * | 9/2021 | Vyunova | H04W 64/006 |
| 11,598,882 B2 * | 3/2023 | McNelis | H04W 64/006 |
| 11,727,303 B2 * | 8/2023 | Gan | G01W 1/14 |
| | | | 706/12 |
| 11,983,641 B2 * | 5/2024 | Brebner | G06F 8/315 |
| 12,019,416 B2 | 6/2024 | Lukaszewski et al. | |
| 12,085,411 B2 * | 9/2024 | Nurminen | G01C 21/383 |
| 12,313,747 B2 | 5/2025 | Ganu et al. | |
| 2010/0332406 A1 | 12/2010 | Kinnemann | |
| 2014/0004876 A1 | 1/2014 | Fuller et al. | |
| 2014/0114568 A1 | 4/2014 | Park | |
| 2016/0128158 A1 | 5/2016 | Harder | |
| 2019/0120806 A1 | 4/2019 | Yan et al. | |
| 2019/0385452 A1 | 12/2019 | Nangeroni et al. | |
| 2020/0293753 A1 | 9/2020 | Sehgal et al. | |
| 2021/0400432 A1 * | 12/2021 | Ivanov | H04W 4/024 |
| 2022/0128399 A1 | 4/2022 | Xu et al. | |
| 2023/0322259 A1 | 10/2023 | Sadek et al. | |
| 2023/0370831 A1 | 11/2023 | Cheekatla et al. | |
| 2024/0310803 A1 | 9/2024 | Lukaszewski et al. | |

FOREIGN PATENT DOCUMENTS

| | | |
|---|---|---|
| CN | 113176587 A | 7/2021 |
| WO | 2007/082720 A1 | 7/2007 |
| WO | 2011/139240 A1 | 11/2011 |
| WO | 2017/048415 A1 | 3/2017 |

OTHER PUBLICATIONS

3D City Database, "Welcome to the 3D City Database!", available online at <https://web.archive.org/web/20241212155402/https://github.com/3dcitydb>, Dec. 12, 2024, 3 pages.

3DBuildings, "How building data works: Level of Detail", available online at <https://3dbuildings.medium.com/how-building-data-works-level-of-detail-e9bad0b61baa>, Jul. 14, 2020, 12 pages.

Microsoft, "Azure Maps", available online at <https://web.archive.org/web/20220921021928/https://azure.microsoft.com/en-us/products/azure-maps/>, Sep. 21, 2022, 18 pages.

OpenStreetMap contributors, "OpenStreetMap provides map data for thousands of websites, mobile apps, and hardware devices", available online at <https://web.archive.org/web/20250401000229/https://www.openstreetmap.org/ about>, Apr. 1, 2025, 2 pages.

* cited by examiner

700
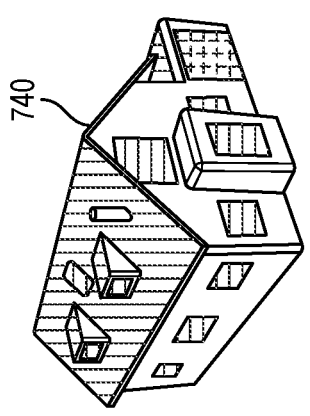
740
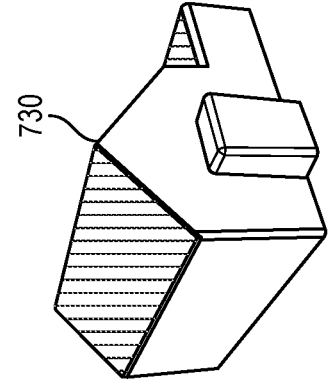
730
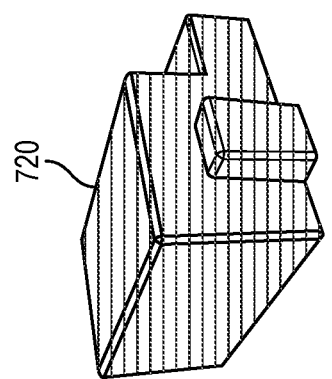
720
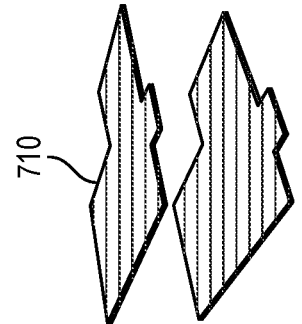
710
FIG. 7

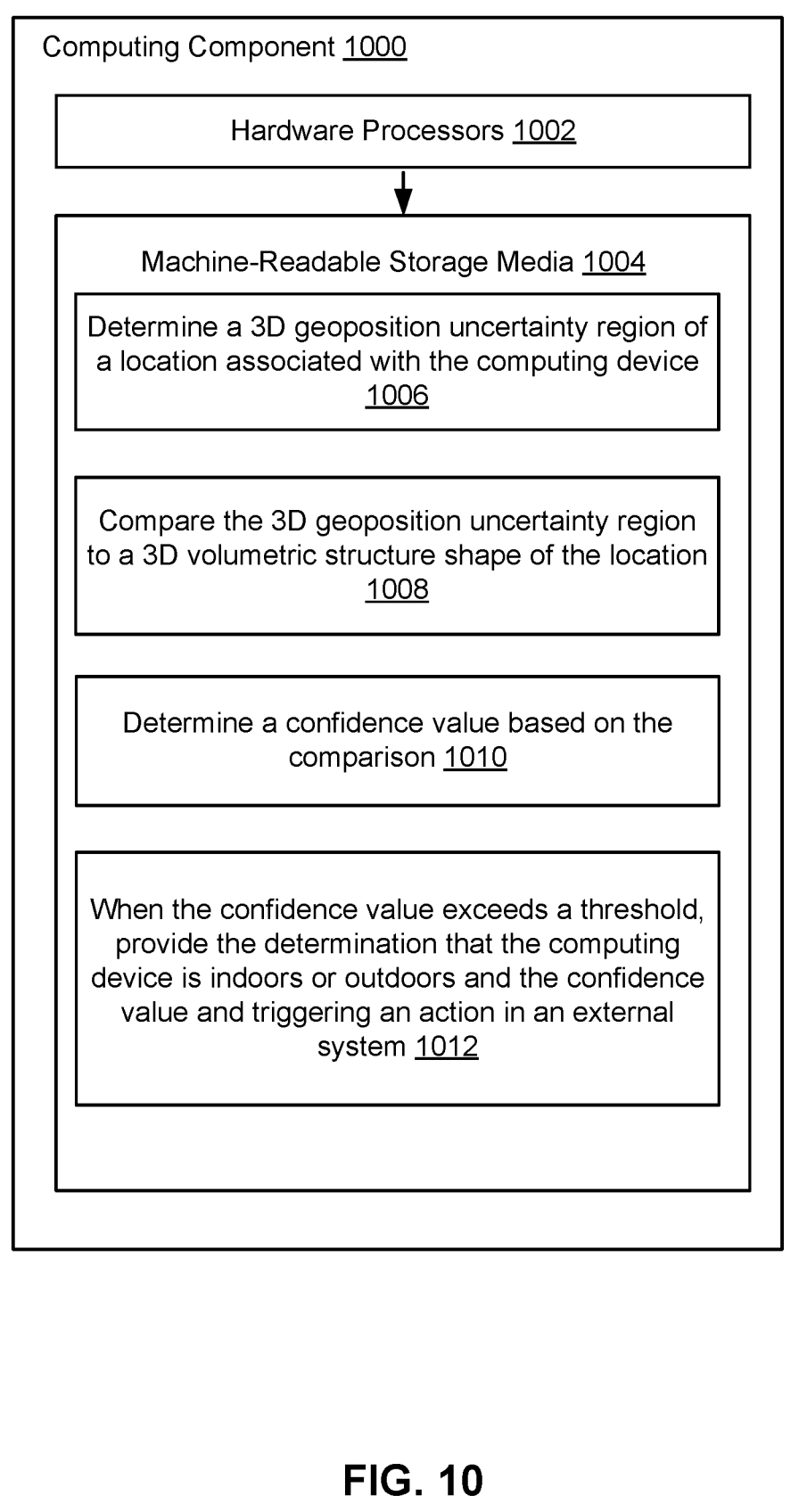

Computing Component 1000

Hardware Processors 1002

Machine-Readable Storage Media 1004

Determine a 3D geoposition uncertainty region of a location associated with the computing device 1006

Compare the 3D geoposition uncertainty region to a 3D volumetric structure shape of the location 1008

Determine a confidence value based on the comparison 1010

When the confidence value exceeds a threshold, provide the determination that the computing device is indoors or outdoors and the confidence value and triggering an action in an external system 1012

FIG. 10

AUTOMATIC DETERMINATION OF INDOOR OR OUTDOOR STATE OF A DEVICE BASED ON 3D GEOPOSITION AND VOLUMETRIC STRUCTURAL DATA

BACKGROUND

Today's wireless devices are able to perform many tasks that were impossible to perform by devices in existing computing environments. Advancements in technology have given both fixed and mobile devices the ability to detect their location using a Global Navigation Satellite Systems (GNSS) or, for example, the ability to directly identify and quantify other phenomena in the local environment in order to customize functions of the device such as brightening or darkening a display in response to ambient lighting conditions. It is increasingly necessary for devices to make decisions based on environmental states that cannot be directly measured. One example is whether a device is indoors or outdoors, knowledge of which could enable a device to trigger important workflows, alter various aspects of device operation (such as changing screen brightness or powering up/down certain components), or perform other functions. Certain other use cases, such as compliance with certain radio regulations that restrict operation in indoor or outdoor conditions, may require a more sophisticated method, as discussed in the co-pending application cited herein.

BRIEF DESCRIPTION OF THE DRAWINGS

The present disclosure, in accordance with one or more various examples, is described in detail with reference to the following figures. The figures are provided for purposes of illustration only and merely depict typical examples.

FIG. 7 illustrates levels of relative precision and granularity of 3D volumetric structure shape data, in accordance with some examples of the disclosure.

FIG. 10 is an example computing component that may be used to implement various features of examples described in the present disclosure.

Figure 1:
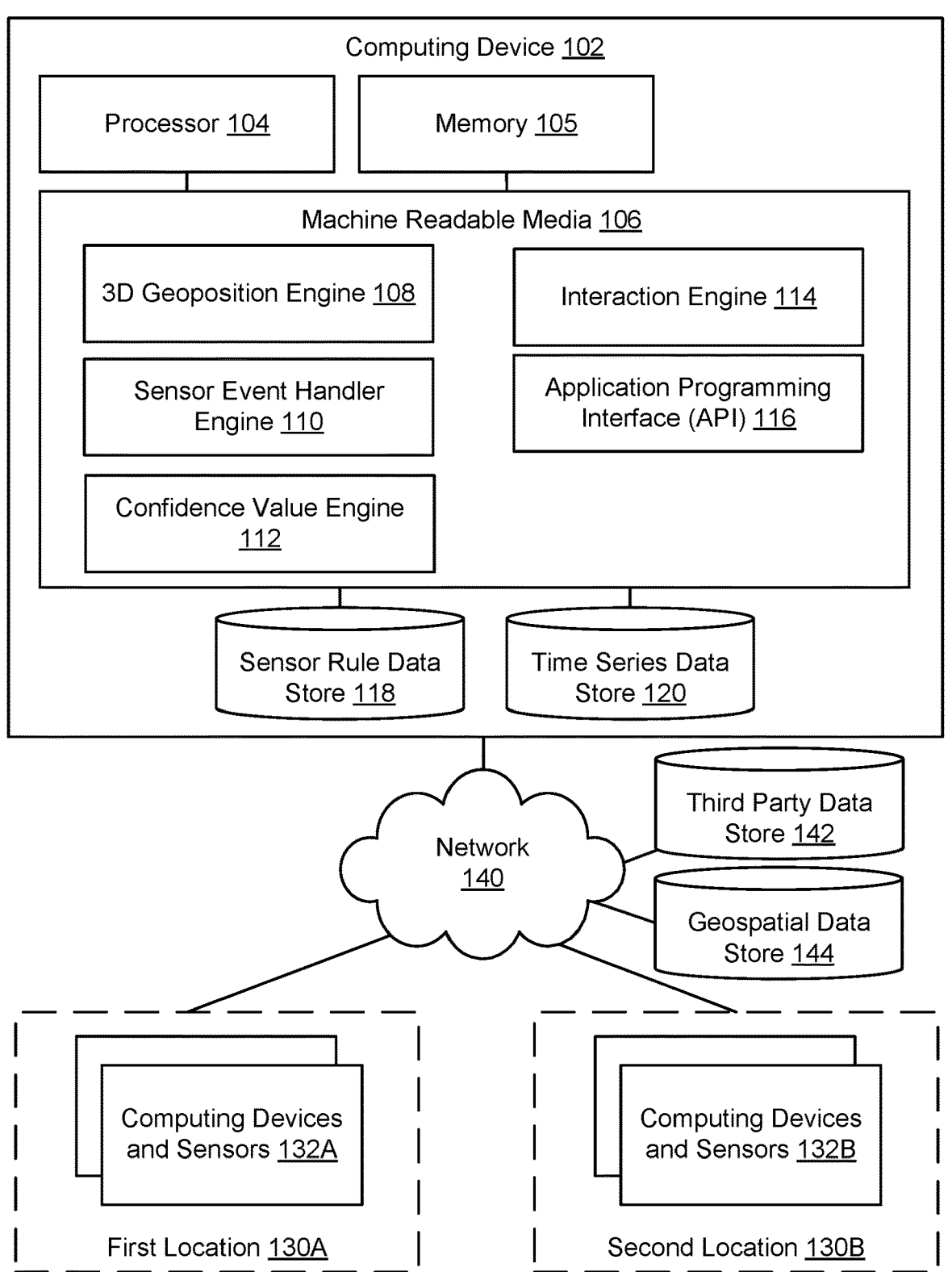
FIG. 1 illustrates a computing device for determining an indoor or outdoor state of a device's location, in accordance with some examples of the disclosure.

The figures are not exhaustive and do not limit the present disclosure to the precise form disclosed.

DETAILED DESCRIPTION

Electronic devices are increasingly self-aware of environmental variables in order to execute a particular function. For example, a software application installed with a computing device can determine whether the device is "at home" or some other predetermined location in order to trigger actions or workflows. One particular environmental variable that is difficult to determine is whether the device is located in an indoor or outdoor environment.

Several existing systems attempt to infer the indoor or outdoor state of a computing device by relying upon a combination of device location estimates or 2D map data to estimate whether the location of the device corresponds to a location on the map (e.g., an indoor location of a building or other location). For example, these existing systems may supplement Global Navigation Satellite Systems (GNSS) data with sensor data to determine the geolocation of the computing device. Some systems may also compare this estimated geolocation with a 2D map and determine more information about the location that is represented in the map. In this manner, existing systems may attempt to determine whether the computing device is contained within a building footprint with a combination of GNSS, sensor data, and map data.

Such attempted inferences cannot reliably reveal whether the computing device is actually in an indoor or outdoor location when, for example, the computing device is located in an alleyway between two high-rise buildings or the computing device is located next to an exterior wall of the building with a thick frame. In these cases and many more, simple two-dimensional analysis of a device location relative to a building footprint could not be relied upon to provide an accurate result, in part due to radio interference and inaccuracies in the geoposition data.

Examples of the application can deterministically estimate whether the location of a computing device that is fixed or movable is inside or outside of a building based comparing a confidence value to a threshold value. The confidence value may be generated using a 3D geoposition of the device and comparing it with one or more 3D volumetric, vector, or building data stores and databases (used interchangeably or referred to as 3D volumetric structure shape data) containing high resolution models of a building where the device is located. The determination of the location may be required within a specified timeframe (e.g., 1 minute to 60 minutes) to reach a minimum desired confidence level for a given use case (e.g., 95% confidence score), although specific time, accuracy, and confidence constraints are not necessary in all examples.

For the case of moving devices it may be that a low or moderate confidence is the best that can be expected, with the potential maximum confidence limit being inversely proportional to the velocity of the device. Since velocity itself can be determined with widely-available and low-cost sensors this adjustment to confidence levels as compared with the fixed case can be calculated by the examples discussed throughout the disclosure.

Examples of the present disclosure are capable of deterministically estimating the location of a computing device, including the likelihood that the computing device is located in an indoor or an outdoor environment, based on a 3D geoposition uncertainty region of a location and a 3D volumetric structure shape of the location. For example, at least these two data sets of the location can be compared to determine a confidence value associated with a likelihood that the location associated with the computing device is indoors or outdoors. When the confidence value exceeds a specified threshold, the determination may trigger an action in an external system. Using these values and comparisons, the system can deterministically estimate the location of a first set of computing devices and sensors that are placed indoors of a building fixed at a first location, and the location of a second set of computing devices and sensors placed outdoors adjacent to the building fixed at a second location.

As defined herein, "fully indoors" may describe or characterize a location that corresponds with a computing device or sensor that is physically inside of a structure. The structure may have walls on all sides, some type of engineered floor system, and/or a roof structure sufficient to protect against most weather conditions. The structure may have doors and windows that open from time to time, where the aperture of the openings is small relative to the size of the structure. The doors and windows may be assumed to be generally closed for security, climate control, or other reasons, although may not be directly relevant to the location determination of being in an indoor or outdoor state.

In some examples, the determination of the indoor or outdoor state may be associated with a lower confidence value, causing the location of the computing device to remain fully within the structure, fully outdoors from the structure, or somewhere in between. Additional illustrations are provided throughout the disclosure, including at FIG. 2.

The disclosed system can identify these and other states of the computing device using 3D geoposition and 3D volumetric structure shape analytics. The analytics may include, for example, if/then/else threshold comparisons, geoposition and 3D volumetric structure shape data, or linear programming. Any of these approaches can determine a confidence value corresponding with the indoor or outdoor state of the computing device and whether to recalculate the location and confidence value upon movement of the device in real-time.

In some examples, the system may automatically determine the indoor or outdoor state of a computing device by comparing the 3D geoposition of the device, an associated uncertainty region, and data from a geospatial data store of 3D volumetric structure shapes. The geoposition of the computing device may be established by, for example, GNSS measurements, 802.11 fine timing measurement, signal strength multi-lateration using 802.11 or Bluetooth, dead reckoning, or combinations of any of these on or off the device.

In some examples, the system may aggregate multiple adjacent 3D structures to determine the 3D volumetric structure shape. The data may comprise structures that share common walls or structures with small separations such as alleyways.

Technical improvements are realized throughout the disclosure. For example, the disclosed system can more accurately detect the indoor or outdoor state of the computing device and sensors, which can create more accurate data processing. Additionally, the use of the more accurate data and location determinations can be implemented in external systems to improve home automation tasks, adjusting image parameters in a security system, reporting patterns of changes over time of the device location, or other automated processes that may rely on determining characteristics of the state of the computing device.

FIG. 1 illustrates a computing device for determining an indoor or outdoor state of a device, in accordance with some examples of the disclosure. In computing device 102, processor 104, memory 105, and machine readable media 106 are provided. Computing device 102 may be in communication with one or more locations 130 comprising a set of computing devices and sensors 132 via network 140. In some examples, network 140 is an internal network (e.g., LAN or WAN), public internet, or public cloud computing environment.

Processor 104 may be one or more central processing units (CPUs), semiconductor-based microprocessors, containers, virtual machines, and/or other hardware devices suitable for retrieval and execution of instructions stored in computer readable media 106. Processor 104 may fetch, decode, and execute instructions to control processes or operations for creating and implementing the described analytics algorithm(s). As an alternative or in addition to retrieving and executing instructions, processor 104 may include one or more electronic circuits that include electronic components for performing the functionality of one or more instructions, such as a graphics processor unit (GPU), field programmable gate array (FPGA), application specific integrated circuit (ASIC), or other electronic circuits.

Memory 105 may include a random access memory (RAM), non-volatile RAM (NVRAM), cache, and/or other dynamic storage devices for storing information and instructions to be executed by processor 104. Memory 105 also may be used for storing temporary variables or other intermediate information during execution of instructions to be executed by processor 104. Such instructions, when stored in computer readable media 106 accessible to processor 104, rendering computing device 102 into a special-purpose machine that is customized to perform the operations specified in the instructions.

Memory 105 may include a read only memory (ROM) or other static storage device for storing static information and instructions for processor 104. Memory 105 may include a magnetic disk, optical disk, solid state disk (SSD), Non Volatile Memory Express (NVMe) or USB thumb drive (Flash drive), etc. for storing information and instructions. In some examples, the information and instructions may be stored in a plurality of data stores, including sensor rule data store 118 and time series data store 120.

Computer readable media 106 may be any electronic, magnetic, optical, or other physical storage device that contains or stores executable instructions. Computer readable media 106 may be, for example, an Electrically Erasable Programmable Read-Only Memory (EEPROM), a storage device, an optical disc, and the like. In some examples, computer readable media 106 may be a non-transitory storage medium, where the term "non-transitory" does not encompass transitory propagating signals. As described in detail below, computer readable media 106 may be encoded with executable instructions implemented with a plurality of modules, circuits, and engines, including 3D geoposition engine 108, sensor event handler module 110, confidence value engine 112, interaction engine 114, and API 116.

Figure 2:
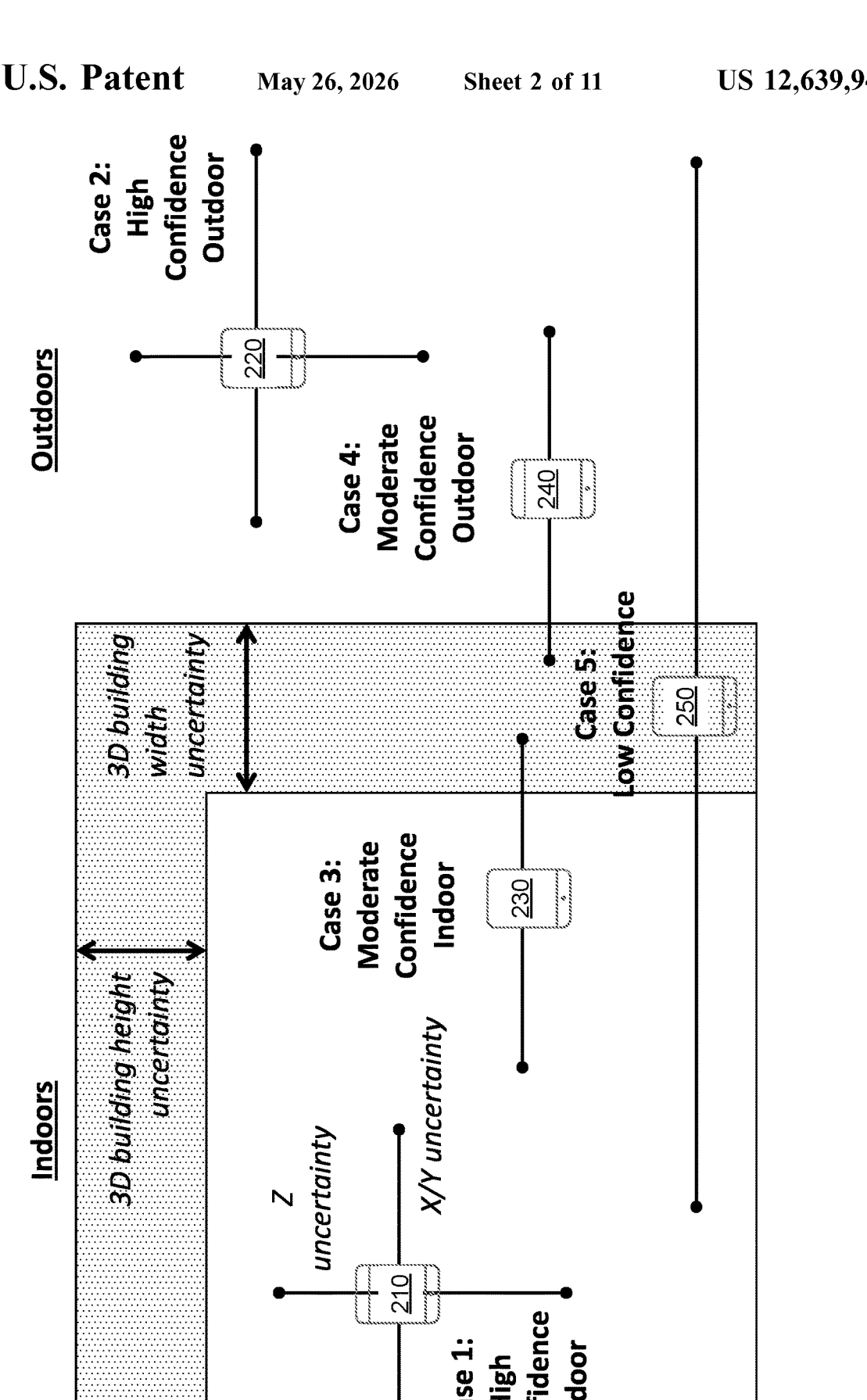
FIG. 2 illustrates a plurality of use cases where a location of a computing device may be uncertain, in accordance with some examples of the disclosure.

3D geoposition engine 108 is configured to help determine the location of computing device 102 based on various 3D geoposition uncertainty introduced in the data, as illustrated in FIG. 2. In this example, the Vertical (Z) Axis is provided in a top to bottom illustration and the Horizontal (X/Y) Axis is provided in a left to right illustration. Uncertainties in the data and location can be provided throughout these axes. A plurality of locations are identified, for example, based on the 3D geoposition uncertainty region of the location and 3D volumetric structure shape of the location. The placement of each of these locations is associated with a confidence value associated with the likelihood that the location associated with the computing devices indoors or outdoors. These locations of computing device 102 are considered throughout the disclosure.

At block 210, computing device 102 of FIG. 1 may be detected based on various uncertainties across multiple axes, including x-axis, y-axis, or z-axis. In this example, the indoor or outdoor state of computing device 102 may be identified in association with these uncertainties as having a high confidence of being fully indoors. In other words, the uncertainties associated with the data continues to place computing device 102 fully indoors, so the confidence value associated with the location of the device as indoors exceeds a threshold value.

At block 220, computing device 102 may be detected based on various uncertainties across multiple axes, which is similar to block 210. In this example, even with the uncertainties, the location of the device may continue to be placed fully outdoors, so the confidence value associated with the location of the device as outdoors exceeds a threshold value.

At block 230, computing device 102 may be detected based on various uncertainties across multiple axes. In this example, computing device 102 may have a moderate confidence value of being indoors with a moderate chance of being located outdoors as well. The confidence value associated with this location may be reduced based on the uncertainty of being indoors or outdoors, since the data identify the device as being indoor or outdoor, with a higher likelihood that the device is placed indoors.

At block 240, computing device 102 may be detected based on various uncertainties across multiple axes, which is similar to block 230. In this example, even with the uncertainties, the confidence value associated with this location may be reduced based on the uncertainty of being indoors or outdoors, since the data identify the device as being indoor or outdoor, with a higher likelihood that the device is placed outdoors.

At block 250, computing device 102 may be detected based on various uncertainties across multiple axes. In this example, the confidence value is low when compared with a threshold value. As such, there is a low confidence value that the computing device can be determined to be located in either state of being indoor or outdoor.

Returning to FIG. 1, 3D geoposition engine 108 is also configured to receive geoposition data from one or more computing devices and sensors 132 from various locations 130. Sensor data and corresponding time stamp and device identifier that generated the sensor data may be stored in time series data store 120 at computing device 102.

Figure 3:
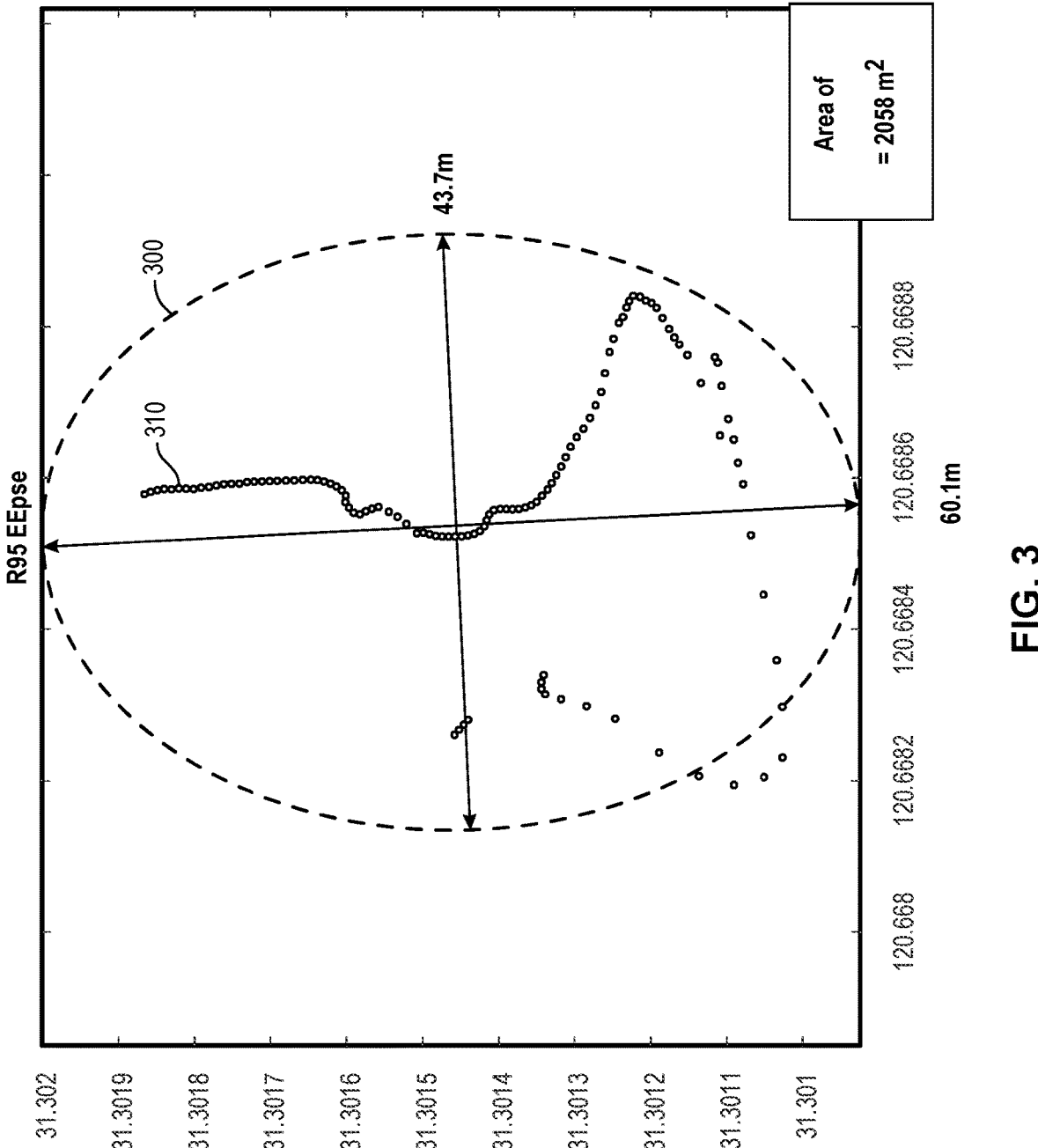
FIG. 3 illustrates an ellipse describing the area of uncertainty to a given confidence level of the estimated locations of a device presumed stationary based on GNSS measurements collected within a period of time, in accordance with some examples of the disclosure.
Figure 4:
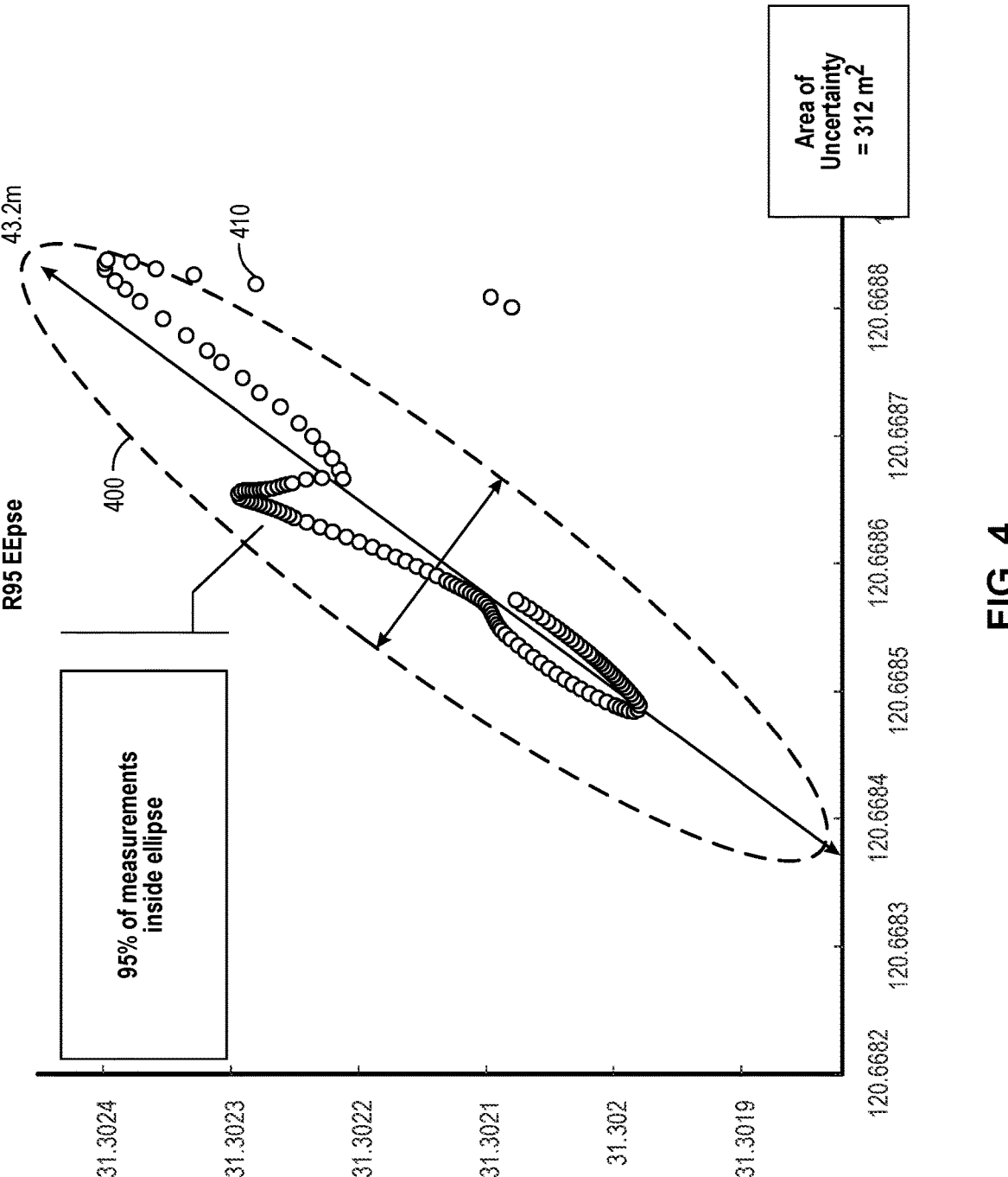
FIG. 4 illustrates an ellipse describing the area of uncertainty to a given confidence level of the estimated locations of a device presumed stationary based on GNSS measurements collected within a period of time, in accordance with some examples of the disclosure.
Figure 5:
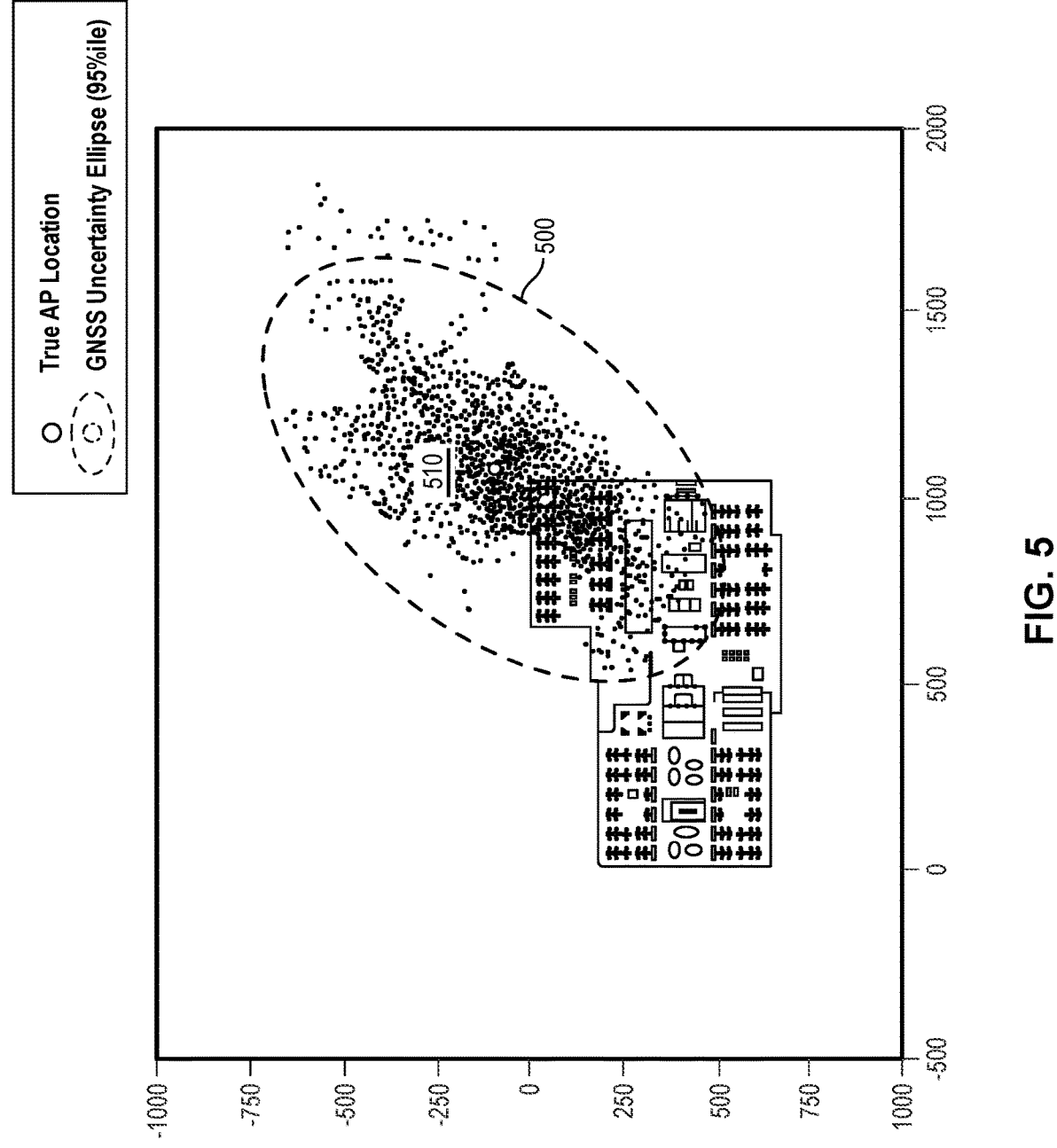
FIG. 5 illustrates an actual device location within an area of uncertainty to a given confidence level of the estimated location of a device presumed stationary based on GNSS measurements collected over a period of time, in accordance with some examples of the disclosure.

The 3D geoposition data may include a representation of location uncertainty, as illustrated with FIGS. 3-5. Each of these geoposition data charts show computing device measurements from a computing device that is located indoors at a fixed location for a period of time. The representations of the location of the computing device in these examples are shown as 2D representations for illustrative purposes. In a physical environment, the 3D geoposition data may also include locations and variations in the Z axis. As such, the 3D geoposition uncertainty region corresponds with a 3D volume.

In FIG. 3, the reported 3D geoposition of an object may correspond with 3D geoposition uncertainty region 300 and specific confidence level rather than a point. Each point 310 represents geospatial coordinates corresponding with a measured geolocation at a point of time. A plurality of points 310 in the chart shows locations of the device that have been determined and transmitted to computing device 102 in FIG. 1, which are received in any order. 3D geoposition uncertainty region 300 is a computational determination of encompassing, for example, 95% of the measurements, which denotes the area of uncertainty in the geoposition of a device. In this example, each device is known with 95% confidence to be physically located somewhere inside its uncertainty ellipse.

In FIG. 4, the reported 3D geoposition of an object may correspond with 3D geoposition uncertainty region 400 and specific confidence level rather than a point. Each point 410 represents geospatial coordinates corresponding with a measured geolocation at a point of time. A plurality of points 410 in each chart show locations of the device that have been determined and transmitted to computing device 102 in FIG. 1, which are received in any order. 3D geoposition uncertainty region 400 is a computational determination of encompassing, for example, 95% of the measurements, which denotes the area of uncertainty in the geoposition of a device. In this example, each device is known with 95% confidence to be physically located somewhere inside its uncertainty ellipse.

In FIG. 5, the geoposition data is received over a time period (e.g., 24 hours for a device indoors on the 5th floor of a structure). The 3D geoposition of the computing device may correspond with 3D geoposition uncertainty region 500, encompassing 95% of the measurements. Each point 510 represents geospatial coordinates corresponding with a measured geolocation of the device at a point of time, and each one could have been determined and transmitted to computing device 102 in FIG. 1. The number of points 510 inside 3D geoposition uncertainty region 500 illustrates that the position is not certain even for devices that are fixed in position. Devices in motion may experience additional variation.

Figure 6:
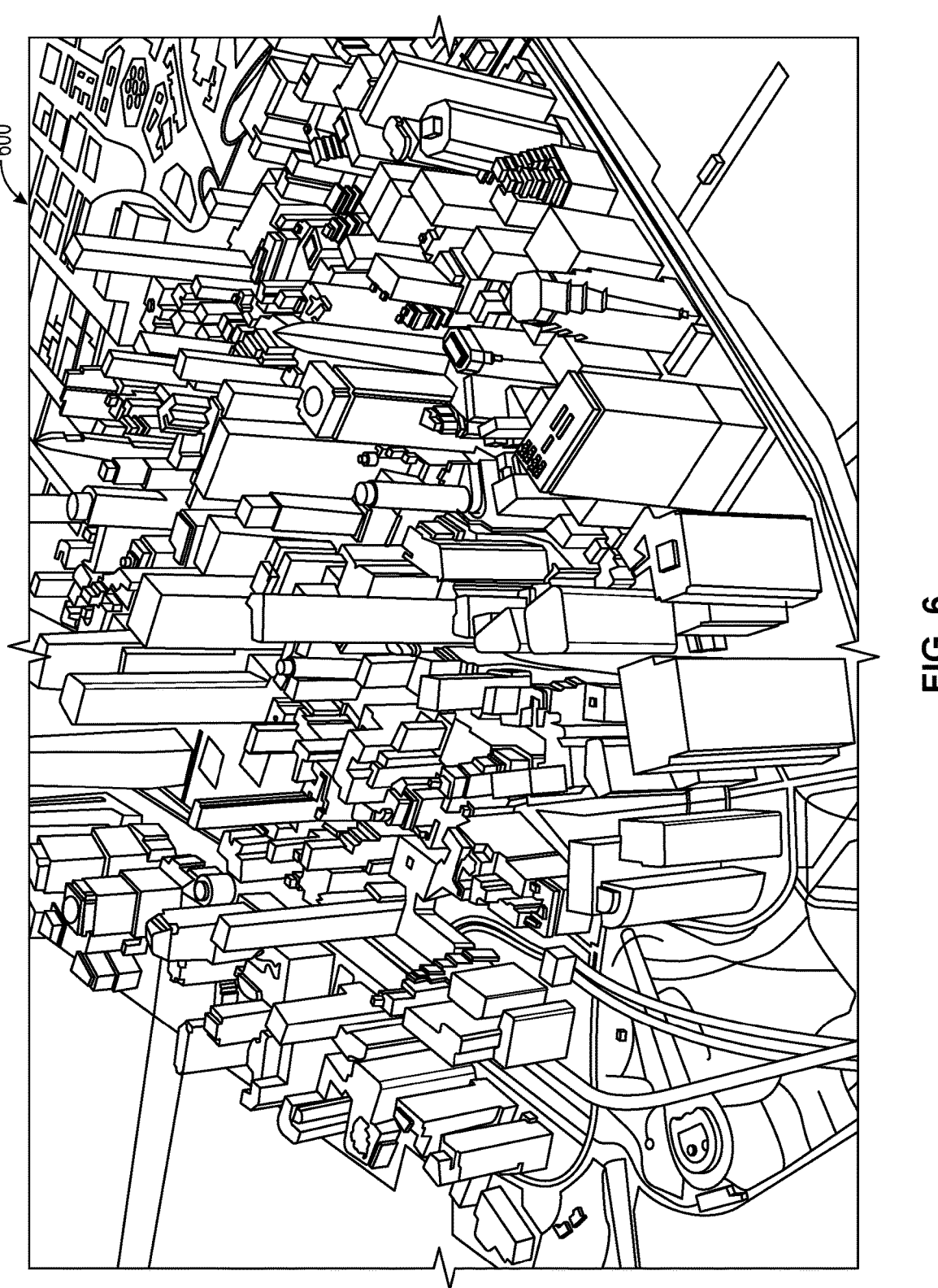
FIG. 6 illustrates a geospatial 3D volumetric structure shape data, in accordance with some examples of the disclosure.

3D geoposition engine 108 is also configured to receive a 3D volumetric structure shape of the location, as illustrated in FIGS. 6 and 7. The 3D volumetric structure shape of the location is stored in geospatial data store 144 of FIG. 1.

In FIG. 6, a plurality of 3D building shapes is provided that corresponds with an illustration of a physical location 600. These 3D building shapes may be stored in standardized formats (e.g., like GeoJSON or SHP files). 3D geoposition engine 108 may query the data using one or more standardized geospatial query protocols, to search and retrieve the 3D building shapes (e.g., in geographic information system (GIS) systems). They can be constructed in a variety of ways, two of the most common being airborne side-look LIDAR scanning and satellite-based synthetic aperture radar to obtain one or more stereoscopic 3D views.

In FIG. 7, the plurality of 3D building shapes illustrated in the physical location 600 of FIG. 6 may be stored in a range of accuracy and resolution types, from very coarse to very fine-grained, shown from left to right. For example, the very coarse level of detail 3D building shape 710 provides elevation levels of the structure without walls, windows, or roof, among other features. The next more detailed level of detail 3D building shape 720 provides elevation levels and walls of the structure without windows or roof, among other features. The next more detailed level of detail 3D building shape 730 provides elevation levels, walls, and a roof of the structure without windows, among other features. The next more detailed level of detail 3D building shape 740 provides elevation levels, walls, roof, and windows of the structure. Other sources of 3D building shapes may render buildings in similar levels, for example, rendering a basilica from simple cylinders (very coarse) to refined octagonal structures (fine-grained).

Using the 3D building shapes, various building features may be known to within a threshold accuracy value (e.g., 1-2 meters, or even a centimeter measurement value) depending on the technology in use. The accuracy and resolution of the building shapes may help identify, for example, corners or rooflines. In some examples, the accuracy and resolution of the 3D building shapes may vary. For example, when the resolution of the 3D building only includes a number of floors and general exterior measurements of the building, the uncertainty of the location of the device may be increased. In another example, when the resolution of the 3D building includes detailed floor definitions and exterior measurements of the building, the uncertainty of the location of the device may be decreased.

In some examples, third party data from third party data store 142 may be received at computing device 102 (via network 140) and stored with time series data store 120. For example, online information sources may store real time data (e.g., locations of the device captured from external sources, etc.). The third party data may be compared to local geoposition data. The comparison may help reduce the minimum observation period of the sensor data by supplementing patterns and additional data over time.

All of this and other data discussed in the disclosure may be received and processed by 3D geoposition engine 108. For example, 3D geoposition engine 108 may receive a minimum volume of sensor data for a minimum sampling time. For example, certain sensor types may be capable of making an initial determination that a computing device or sensor 132 is or is not outdoors over very small timescales (e.g., perhaps a few seconds). In these examples, the initial confidence value may improve by some predictable amount with repetition over time.

Sensor event handler module 110 is configured to receive an event from a computing device or sensor 132 and determine one or more actions to take in response to the received event. For example, the action may be to re-evaluate the predicted environment of the computing device or sensor 132 (e.g., based on movement, delay of time between two sensor readings, an automated trigger to request or process additional data, etc.). The criteria used to establish indoor or outdoor status of computing device or sensor 132 may be distinct from and/or independent of those used to determine that such a state may have changed and that a re-evaluation is warranted.

Confidence value engine 112 is configured to determine a confidence value corresponding with the likelihood that computing device or sensor 132 is in an indoor or outdoor state. For example, the confidence value may be determined based on the comparison between the 3D geoposition uncertainty region and 3D volumetric structure shape of the location. When the 3D geoposition uncertainty region of the device (e.g., illustrated in FIGS. 3-5) is within a threshold amount of the 3D volumetric structure shape (e.g., illustrated in FIGS. 6 and 7), the confidence value is determined to be the likelihood that the location associated with the computing device is indoors or outdoors (e.g., of the identified structure).

In some examples, the determination of the confidence value is provided via a Software Development Kit (SDK) Application Programming Interface (API) call, data register, or network broadcast/multicast transmission to a second device (e.g., external system, computing devices and sensors 132, etc.).

The confidence value may be increased or decreased based on the amount of the 3D geoposition uncertainty region that maps to being fully inside 3D volumetric structure shape of the location. The confidence value associated with the indoor or outdoor state determination may be adjusted higher or lower than the amount of the 3D geoposition uncertainty region that is encompassed by the 3D volumetric structure shape of the location.

In some examples, multiple structures may be associated with the 3D volumetric structure shape, corresponding with multiple locations (e.g., in a downtown setting with multiple buildings close together). In this example, the 3D geoposition uncertainty region may be derived from GNSS data to include some of the volume occupied by one building, some of the volume occupied by an adjacent building, and some of the open region between them. The region in between the structures may be inconsistent with the GNSS received signal levels and the region in one of the adjacent buildings may be inconsistent with inter-device IEEE 802.11 fine time measurement data.

In some examples, the confidence value or range of values may be adjusted based on the external system. For example, different applications and use cases may distinguish between indoor and outdoor states or the confidence values may need to be adjusted to be higher or lower than the originally determined confidence value.

In some examples, the determined confidence value may be increased when a number of computing devices or sensors 132 are combined to provide many sources of geoposition over a larger area. This may improve the probability of detection with more sensors, computing devices, and/or external databases. For example, a computing device with coarse geoposition awareness and internet access can further improve its confidence value by comparing data from one or more sensors with access to even more data signatures via third party data store(s) 142.

In some examples, when the confidence value exceeds a threshold, the determination that the computing device is indoors or outdoors and the confidence value may be provided to an external system.

The threshold may be associated with the system's confidence that the indoor or outdoor state rises above a certain threshold value. The device location may include an estimate of the uncertainty. Other uncertainty may be included as well, including in association with the 3D volumetric structure shape. For example, the 3D volumetric structure shape may include some coarseness of its resolution and possibly some uncertainty in the methods used to create it. The confidence value may correlate to whether these two spaces (e.g., the indoor or outdoor state uncertainty and the 3D volumetric structure shape uncertainty) overlap.

In some examples, the confidence value may be compared to a use-case dependent threshold, including one or more threshold values (where a confidence threshold value or threshold value may be used interchangeably). As described throughout the disclosure, one or more thresholds may be incorporated with the disclosure without diverting from its essence.

One or more confidence thresholds may be determined. For example, a threshold may be associated with a binary determination that the device is indoors or not indoors. Similarly, the location threshold may be associated with a binary determination that the device is outdoors or not outdoors.

In some examples, a threshold may be associated with a range of values, including a high likelihood that the location of the device is indoors, a high likelihood that the location of the device is outdoors, or a high likelihood that the location of the device is unknown to be either indoors or outdoors. In these examples, when the confidence value exceeds the specified threshold, the determination of the state of the device may be a high likelihood that the location of the device is in that state (e.g., indoors, outdoors, or unknown). Similarly, when the confidence value fails to exceed the specified threshold, the determination of the state of the device may be unknown with respect to the location of the device being in a particular state (e.g., indoors, outdoors, or unknown).

In some examples, more than one threshold may be determined. For example, the system may identify a first threshold associated with indoor locations and a second threshold associated with outdoor locations. The confidence value may be compared to one or more of these thresholds to determine the likelihood that the computing device exists in the corresponding state.

When more than one threshold is determined, the plurality of thresholds may correspond with different levels. When the confidence values are compared to each threshold, the confidence values may need to be different values in order to exceed a composite of the threshold level. In some examples, the threshold(s) may be set depending on the consequences of the determination of the indoor/outdoor state being wrong for a given use case.

In some examples, the comparison of confidence value to a specified location threshold is illustrated in each of the use cases provided with FIG. 2. For example, the uncertainty may be associated with the data defining the 3D volumetric structure shape of the location. The 3D volumetric structure shape is depicted with the shading between the indoor and outdoor state, corresponding with the 3D building height uncertainty and the 3D building width uncertainty. In these examples, the confidence value associated with the location of the device may exceed the uncertainty associated with the 3D volumetric structure shape data and continue to place the computing device indoors or outdoors even in view of this uncertainty. When the confidence value is lower, the comparison of the confidence value to the specified threshold may not be enough to overcome the inherent and certainty in the environmental data or the device location (e.g., dense and tall structures, alleyways, etc.).

Interaction engine 114 is configured to trigger an action in an external system at one or more locations 130. For example, the action may be selected based on the determination whether the computing devices indoors or outdoors and, in some examples, the corresponding confidence value. By providing the determination and the confidence value, the external system may initiate or trigger an action.

Various actions in external systems are also described. For example, the action in the external system may activate lighting, water features, or other automated workflows corresponding with a home automation system located at a first location 130A. The characteristics of the sensor data may identify when the computing device 132 moves with the user from inside a home to outside, in which computing device 102 may identify that the user has moved from an indoor state to an outdoor state. The action may correspond with activating the lighting in the outdoor state that is in communication with computing device 102, in correspondence with this movement.

In another example, the action in the external system may automatically adjust image parameters associated with a security camera (e.g., to turn on a spotlight in a lowlight environment, etc.). In another example, the action in the external system may alter radio emissions settings, open or close doors and windows, start or stop particulate filters in ventilation systems. In another example, detected patterns of fully indoors or outdoors in the external system may be tracked and used to generate a report of a pattern of movement by the computing device for historical reporting and analysis purposes. The report may be transmitted to one or more computing devices in the external system or an administrative user. In each of these actions, the computing devices performing the actions may be separate from the computing devices and sensors 132A located at first location 130A that provided the initial GNSS or other 3D geoposition data.

In another example, the external system may include enterprise device operation. For devices that can be deployed either indoors or outdoors, the interfaces and other user experience may be adjusted based on the environment. For example, an high-definition (HD) security camera could automatically adjust image parameters to correspond with the outdoor state. In another example, an audio microphone or sensor may automatically select a particular acoustical configuration based on the determination of characteristics of the environment.

In some examples, computing device 102 may communicate with multiple other computing devices that are connected to a common computing system, either directly or through application programming interface (API) 116. For example, API 116 may help publish the estimated state and confidence value to other systems by providing a set of functions and procedures allowing the creation of applications that access the features or data of computing device 102. API 116 may be used to, for example, enable home automation devices or automatically tune adjacent devices based on the determined environment. These and other examples discussed throughout the application may be distinct from a public data network and separate from any of the publicly accessible databases. In other words, the illustrative computing environment may be non-limiting to a single device making an indoor/outdoor determination on its own, but may be implemented as multiple devices, each with its own sensors, sharing those sensor data with each other or a central computer system that makes a determination about the environment of one or more of the locations of the other computing devices.

An illustrative example is shown with FIG. 1, where computing device 102 may communicate via network 140 to one or more computing devices or sensors 132 at various locations 120. Network 140 may comprise a connection through local network to a host computer or to data equipment operated by an Internet Service Provider (ISP) and/or the internal networks at a cloud computing provider. The ISP, in turn, provides data communication services through the world wide packet data communication network (e.g., "Internet") to transmit data packets between computing device 102 and computing devices or sensors 132. Network 140 may use electrical, electromagnetic, or optical signals that carry the digital data streams.

Plurality of locations 130 may comprise indoor or outdoor states. For example, the computing devices and sensors 132A may be placed indoor a building statically located at first location 130A and computing devices and sensors 1328 may be placed outdoor of the same building statically located at second location 1308.

In some examples, the determination that the computing device is indoors or outdoors may affect the data used in determining future locations (e.g., via 3D geoposition engine 108 in FIG. 1). For example, the system may determine that the computing device is outdoors and use GNSS data to determine the 3D geoposition uncertainty region. In another example, the system may determine that the computing device is indoors and use one or more of fine timing measurement data, signal strength multi-lateration data, or dead reckoning to determine the 3D geoposition uncertainty region. The system may determine this information simultaneously. The determination that the device, with a high degree of confidence, is indoors may be determined from sensor data (e.g., with or without the geolocation of the device). Since some of the 3D geoposition uncertainty region derived from GNSS measurements may include outdoor space, the system may combine the two or more sources of data that the outdoor region may be excluded from consideration without diminishing the location confidence interval.

Figure 8:
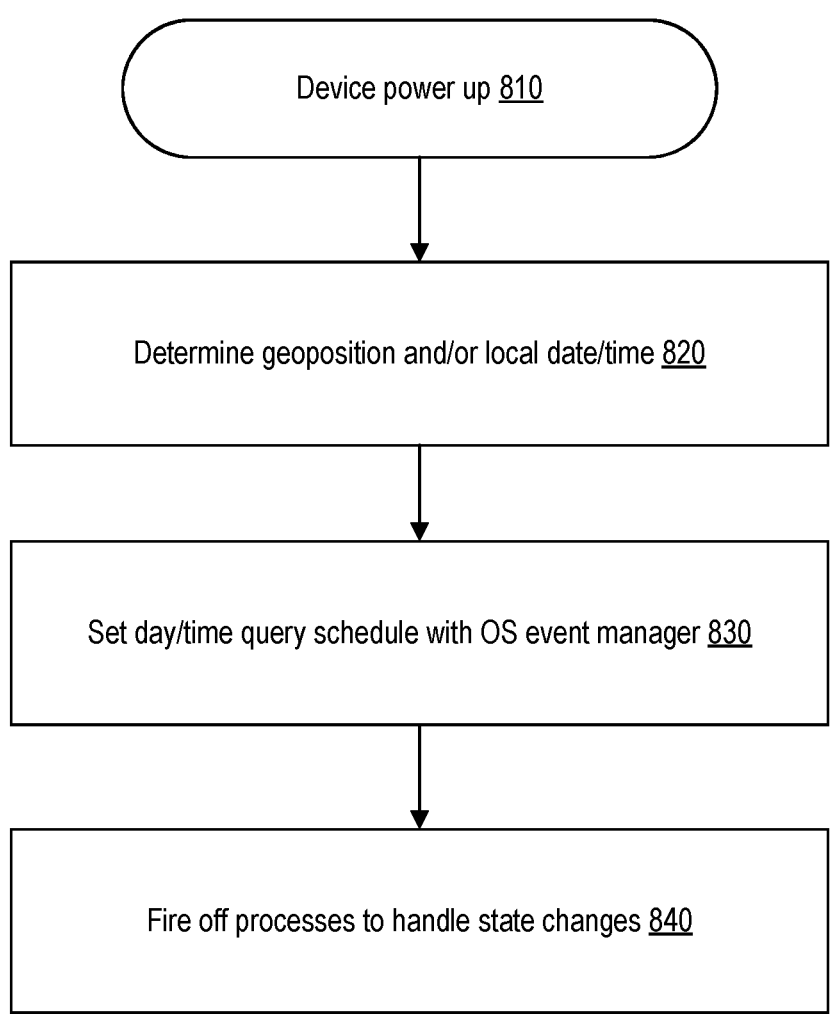
FIG. 8 illustrates a process flow for handling state changes of geolocation sensors, in accordance with some examples of the disclosure.

FIG. 8 illustrates a process flow for initializing sensor readings, in accordance with some examples of the disclosure. Computing device 102 illustrated in FIG. 1 may implement the steps described herein. In some examples, the data collection may comprise sensor data from computing devices that are capable of being registered in the network.

At block 810, the computing device or sensor 132 in FIG. 1 may be powered on. In some examples, computing device 102 in FIG. 1 may transmit a signal to remotely turn on the computing device or sensor 132. In other examples, computing device or sensor 132 may be turned on at a predetermined time or manually.

In some examples, each of the computing devices or sensors 132 may be weighted from power up based on the manufacturer profile of the device. The profile may help provision specific indoor or outdoor determination rules as well. A specific combination of sensor type, sensor quality, or other factors may raise or lower the probability weights for the device.

At block 820, computing device 102 may determine the device's position (e.g., geoposition) and/or obtain a local date/time of the device. The geoposition of the computing device may be established by, for example, GNSS measurements, 802.11 fine timing measurement, signal strength multi-lateration using 802.11 or Bluetooth, dead reckoning, or combinations of any of these on or off the device.

At block 830, computing device 102 may set a day/time query schedule with the operating system event manager. For example, the day/time query schedule may establish a repeated day/time to request the 3D geoposition of the computing device or sensor 132, if necessary, in order to determine the geolocation of the device. Similar queries may be established, including a day/time query to request an associated uncertainty region or a day/time query to request data from a geospatial data store of 3D volumetric structure shapes.

At block 840, computing device 102 may fire off processes to handle state changes. For example, as described throughout the disclosure, computing device 102 of FIG. 1 may activate 3D geoposition engine 108 to request or identify any received geoposition data one or more computing devices and sensors 132 from various locations 130 and determine the 3D geoposition uncertainty region with the one or more geoposition locations for each device. In other examples, computing device 102 may identify that the device is moving and proactively request additional geoposition data. Additional 3D volumetric structure shape data may be requested as well.

In some examples, the 3D geoposition data may be initiated each time the computing device powers up. In some examples, power cycling (e.g., turning the device on and off within a time frame) could be associated with device movement.

Figure 9:
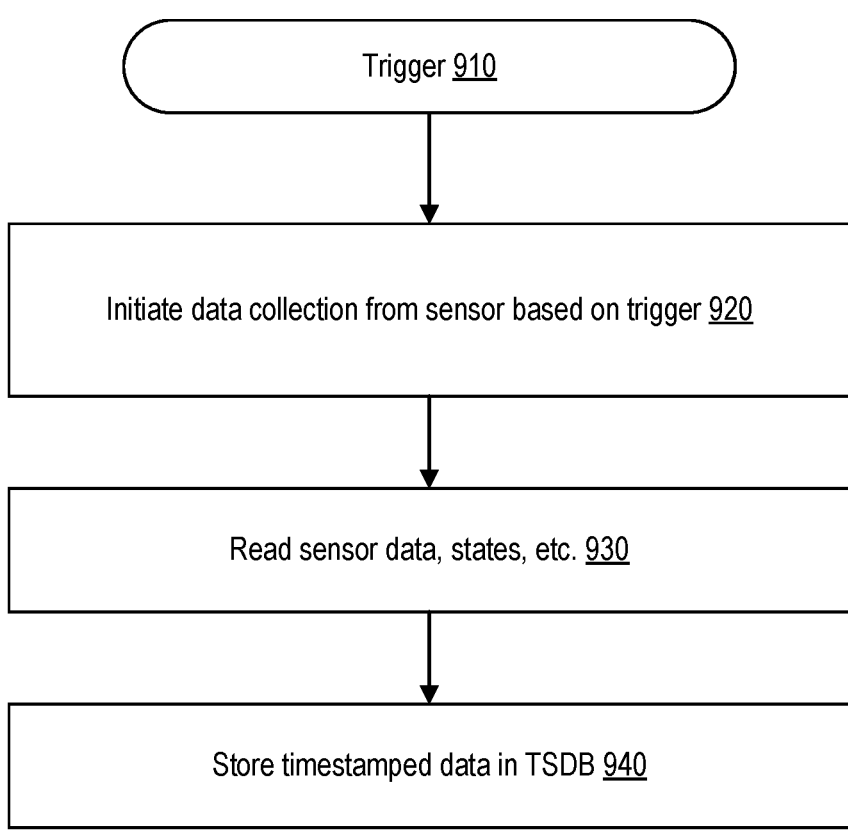
FIG. 9 illustrates a process flow for updating location probabilities, in accordance with some examples of the disclosure.

FIG. 9 illustrates a process flow for determining a confidence value over time, in accordance with some examples of the disclosure. In some examples, the confidence value may be determined without using a reliability value. Computing device 102 illustrated in FIG. 1 may implement the steps described herein in order to, for example, implement a discrete sensor trigger-based process.

In some examples, values of individual or multiple sensors may be compared with expected values. The expected values may be set by either known correlations, historical data, data from reference stations or databases, or other sources. If a specified threshold is exceeded or confidence values are increased or decreased, the system may implement additional data measurements. In some examples, the data measurements may also be triggered periodically or when certain values are expected to raise or lower confidence levels by facilitating comparisons with expected values at those times or under those conditions.

At block 910, computing device 102 may receive a trigger. For example, the trigger may comprise a time or day schedule, a sensor activation or state change, or a programmatic call.

At block 920, computing device 102 may initiate data collection from the sensor based on the trigger.

At block 930, computing device 102 may read sensor data, states, or other information.

At block 940, computing device 102 may store the timestamps sensor data in a time series database (TSDB), including time series data store 120. Computing device 102 may store various sensor log data in the TSDB.

In some examples, computing device 102 may fire off requests for additional sensor data or measurements by specific sensors for disambiguation (e.g., determined based on how computing device 102 is executing).

In some examples, computing device 102 may implement asynchronous and trigger-based (e.g., including scheduled readings) determination of an indoor or outdoor environment. As a sample illustration, the "High Probability Outdoor" bin may be adjusted a little higher or a little lower each iteration loop, up to a maximum or minimum value. This process may not require elaborate if-then-else nested forests in machine executable instructions to try to capture all sensor combinations and values. Each trigger can adjust changed environmental characteristics, as needed.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 10 illustrates an example computing component that may be used to deterministically estimate whether the location of a computing device that is fixed or movable is inside a fully enclosed building or not in accordance with various examples. Referring now to FIG. 10, computing component 1000 may be, for example, a server computer, a controller, or any other similar computing component capable of processing data. In the example implementation of FIG. 10, the computing component 1000 includes a hardware processor 1002, and machine-readable storage medium for 1004.

Hardware processor 1002 may be one or more central processing units (CPUs), semiconductor-based microprocessors, and/or other hardware devices suitable for retrieval and execution of instructions stored in machine-readable storage medium 1004. Hardware processor 1002 may fetch, decode, and execute instructions, such as instructions 1006-1012, to control processes or operations for deterministically estimating whether the location of a computing device that is fixed or movable is inside a building or not. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1004, may be any electronic, magnetic, optical, or other physical storage device that contains or stores executable instructions. Thus, machine-readable storage medium 1004 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1004 may be a non-transitory storage medium, where the term "non-transitory" does not encompass transitory propagating signals. As described in detail below, machine-readable storage medium 1004 may be encoded with executable instructions, for example, instructions 1006-1012.

Hardware processor 1002 may execute instruction 1006 to determine a 3D geoposition uncertainty region of a location associated with the computing device. For example, the 3D geoposition uncertainty region may be a computational determination encompassing 95% of the measurements of the computing devices geolocation. Other percentages may be applicable as well (e.g., other than 95%). These geolocation points may be transmitted to computing device 102 in FIG. 1 and the 3D geoposition uncertainty region may be determined by 3D geoposition engine 108 in FIG. 1.

Hardware processor 1002 may execute instruction 1008 to compare the 3D geoposition uncertainty region to a 3D volumetric structure shape of the location. For example, computing device 102 in FIG. 1 may receive 3D volumetric structure data defining the actual shape of the location, as illustrated in FIGS. 6 and 7. The comparison of the 3D geoposition uncertainty region with the 3D volumetric structure shape can help identify whether the computing device is likely to be indoors or outdoors of the structure at the location.

In some examples, multiple structures may be associated with the 3D volumetric structure shape, which can still qualify the device as being indoors any one of the structures. In this example, the 3D geoposition uncertainty region may be derived from GNSS data to include some of the volume occupied by one building, some of the volume occupied by an adjacent building, and some of the open region between them. The region in between the structures may be inconsistent with the GNSS received signal levels and the region in one of the adjacent buildings may be inconsistent with inter-device IEEE 802.11 fine time measurement data.

Hardware processor 1002 may execute instruction 1010 to determine a confidence value based on the comparison. The confidence value may be determined based on the comparison between the 3D geoposition uncertainty region and 3D volumetric structure shape of the location. When the 3D geoposition uncertainty region of the device (e.g., illustrated in FIGS. 3-5) is within a threshold amount of the 3D volumetric structure shape (e.g., illustrated in FIGS. 6 and 7), the confidence value is determined to be the likelihood that the location associated with the computing device is indoors or outdoors (e.g., of the identified structure).

The confidence value may be increased or decreased based on the amount of the 3D geoposition uncertainty region that maps to being fully inside 3D volumetric structure shape of the location. The confidence value associated with the environment determination may be adjusted higher or lower than the amount of the 3D geoposition uncertainty region that is encompassed by the 3D volumetric structure shape of the location The determination of the location at the fixed or movable location may be required within a specified timeframe (e.g., 1 minute to 60 minutes) to reach a minimum desired confidence level (e.g., 95% confidence score), although specific time, accuracy, and confidence constraints are not necessary in all examples.

Hardware processor 1002 may execute instruction 1012 to provide the determination that the computing device is indoors or outdoors and the confidence value. The information may be provided when the confidence value exceeds a threshold. Providing the information may trigger an action and an external system or location.

Figure 11:
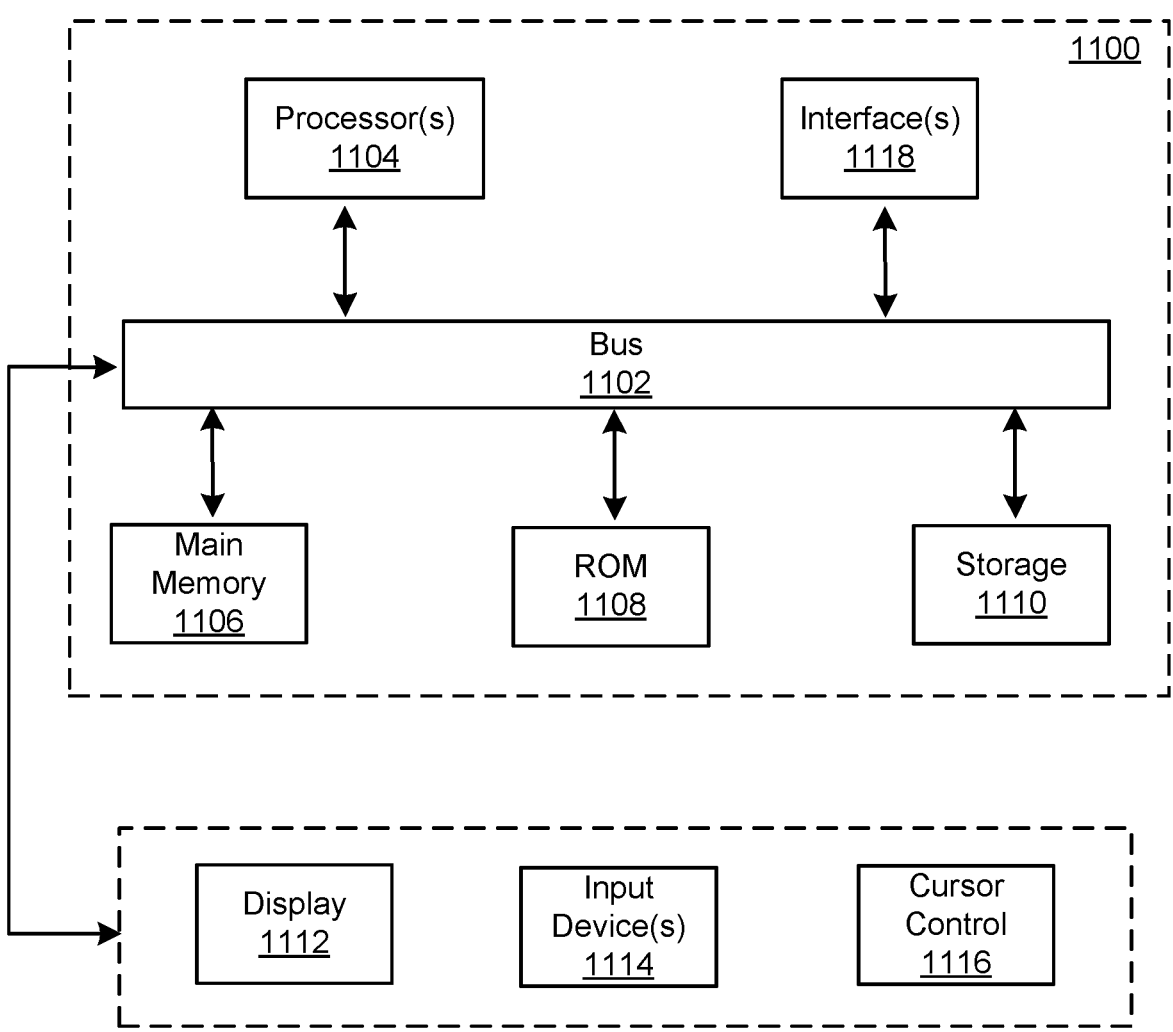
FIG. 11 depicts a block diagram of an example computer system in which various of the examples described herein may be implemented.

FIG. 11 depicts a block diagram of an example computer system 1100 in which various of the examples described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some examples, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one example, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways.

Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "existing," "normal," "standard," "known," and terms of similar meaning should not be construed as limiting the item described to a given time period or to an item available as of a given time, but instead should be read to encompass conventional, traditional, existing, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device for determining that an environment of the computing device location is indoors or outdoors comprising:
a memory; and
one or more processors that are configured to execute machine readable instructions stored in the memory for performing a method comprising:
determining a 3D geoposition uncertainty region of a location associated with the computing device;

comparing the 3D geoposition uncertainty region to a 3D volumetric structure shape of the location, wherein the 3D volumetric structure shape of the location is stored in a geospatial data store;
determining a confidence value based on the comparison, wherein the confidence value is associated with a likelihood that the location associated with the computing device is indoors or outdoors; and
when the confidence value exceeds a threshold, providing the determination that the computing device is indoors or outdoors and the confidence value, and triggering an action in an external system.

2. The computing device of claim 1, wherein the method further comprises:
using one or more of fine timing measurement data, signal strength multi-lateration data, or dead reckoning to determine the 3D geoposition uncertainty region.

3. The computing device of claim 1, wherein the action in the external system activates lighting, water features, or other workflows, and the external system is a component of home automation.

4. The computing device of claim 1, wherein the action in the external system automatically adjusts image parameters and the external system includes a security camera.

5. The computing device of claim 1, wherein the determination is provided via a Software Development Kit (SDK) Application Programming Interface (API) call, data register, or network broadcast/multicast transmission.

6. The computing device of claim 1, wherein the action in the external system automatically adjusts operating emissions characteristics of a radio.

7. The computing device of claim 1, wherein the action in the external system automatically generates an electronic communication on a second protocol based on the determination that the computing device is indoors or outdoors.

8. The computing device of claim 1, wherein the action in the external system comprises, automatically:
detecting a pattern of determinations that the computing device is indoors or outdoors from movement in the environment of 3D geoposition uncertainty regions of locations associated with the computing device; and
generating a report detailing the pattern.

9. A method for determining that an environment of the computing device location is indoors or outdoors comprising:
determining a 3D geoposition uncertainty region of a location associated with the computing device;
comparing the 3D geoposition uncertainty region to a 3D volumetric structure shape of the location, wherein the 3D volumetric structure shape of the location is stored in a geospatial data store;
determining a confidence value based on the comparison, wherein the confidence value is associated with a likelihood that the location associated with the computing device is indoors or outdoors; and
when the confidence value exceeds a threshold, providing the determination that the computing device is indoors or outdoors and the confidence value, and triggering an action in an external system.

10. The method of claim 9, further comprising, one or more of:
determining that the computing device is indoors or outdoors using GNSS data to determine the 3D geoposition uncertainty region; and
using one or more of fine timing measurement data, signal strength multi-lateration data, or dead reckoning to determine the 3D geoposition uncertainty region.

11. The method of claim 9, wherein the action in the external system comprises one or more of:

activating lighting, water features, or other workflows, and the external system is a component of home automation;

automatically adjusting image parameters and the external system includes a security camera; and automatically adjusting operating emissions characteristics of a radio.

12. The method of claim 9, wherein the determination is provided via a Software Development Kit (SDK) Application Programming Interface (API) call, data register, or network broadcast/multicast transmission.

13. The method of claim 9, wherein the action in the external system automatically generates an electronic communication on a second protocol based on the determination that the computing device is indoors or outdoors.

14. The method of claim 9, wherein the action in the external system automatically generates a report detailing a pattern of operation in the environment.

15. A non-transitory computer-readable storage medium storing a plurality of instructions executable by one or more processors, the plurality of instructions when executed by the one or more processors cause the one or more processors to:

determine a 3D geoposition uncertainty region of a location associated with the computing device;

compare the 3D geoposition uncertainty region to a 3D volumetric structure shape of the location, wherein the 3D volumetric structure shape of the location is stored in a geospatial data store;

determine a confidence value based on the comparison, wherein the confidence value is associated with a likelihood that the location associated with the computing device is indoors or outdoors; and when the confidence value exceeds a threshold, provide the determination that the computing device is indoors or outdoors and the confidence value, and triggering an action in an external system.

16. The computer-readable storage medium of claim 15, wherein the plurality of instructions further cause the one or more processors to:

use one or more of fine timing measurement data, signal strength multi-lateration data, or dead reckoning to determine the 3D geoposition uncertainty region.

17. The computing device of claim 1, wherein the triggered action causes the external system to collect additional data from a sensor associated with the location of the computing device.

18. The computing device of claim 1, wherein providing the determination that the computing device is indoors or outdoors and the confidence value and triggering an action in an external system is responsive to the confidence value exceeding the threshold.

19. The computing device of claim 1, wherein determining the 3D geoposition uncertainty region of the location associated with the computing device comprises:

receiving, from the computing device, a plurality of geolocations measured by a sensor associated with the computing device; and determining the 3D geoposition uncertainty region as a geospatial region that encompasses a percentage of the plurality of geolocations, wherein the percentage is set according to a confidence level of the 3D geoposition uncertainty region.

20. The computing device of claim 1, wherein the method further comprises:

responsive to determining that the computing device is outdoors, using GNSS data to determine a 3D geoposition uncertainty region of a future location associated with the computing device;

responsive to determining that the computing device is indoors, using one or more of fine timing measurement data, signal strength multi-lateration data, or dead reckoning to determine a 3D geoposition uncertainty region of a future location associated with the computing device.

* * * * *